United States Patent [19]
Yano et al.

[11]  4,187,004
[45]  Feb. 5, 1980

[54] NEGATIVE TYPE DISPLAY IN ELECTROCHROMIC DISPLAY DEVICE

[75] Inventors: Kohzo Yano, Tenri; Tadanori Hishida, Kashihara; Yasuhiko Inami, Tenri; Tomio Wada, Nara, all of Japan

[73] Assignee: Sharp Kabushiki Kaisha, Osaka, Japan

[21] Appl. No.: 872,315

[22] Filed: Jan. 25, 1978

[30] Foreign Application Priority Data

Jan. 28, 1977 [JP] Japan .................................. 52-9055
Aug. 16, 1977 [JP] Japan .................................. 52-99747

[51] Int. Cl.$^2$ ................................................ G02F 1/17
[52] U.S. Cl. ................................................... 350/357
[58] Field of Search ......................................... 350/357

[56] References Cited
U.S. PATENT DOCUMENTS

| | | | |
|---|---|---|---|
| 3,521,941 | 7/1970 | Deb et al. | 350/357 |
| 3,827,784 | 8/1974 | Giglia et al. | 350/357 |
| 3,892,472 | 7/1975 | Giglia | 350/357 |
| 3,944,333 | 3/1976 | Leibowitz | 350/357 |
| 4,086,003 | 4/1978 | Kouchi et al. | 350/357 |

Primary Examiner—James W. Davie
Attorney, Agent, or Firm—Birch, Stewart, Kolasch and Birch

[57] ABSTRACT

A transparent electrode is formed on a transparent substrate in a desired configuration. An electrochromic layer is formed on the entire surface of the transparent substrate inclusive of the surface of the transparent electrode. The electrochromic layer is initially placed in the coloration state. A back layer which exhibits color sensation different from that of the coloration state of the electrochromic layer is disposed above the electrochromic layer. A desired electrode is selected to bleach the electrochromic layer formed thereon, through which the back layer is recognized, thereby displaying a desired pattern in the negative type.

11 Claims, 13 Drawing Figures

NEGATIVE TYPE DISPLAY IN ELECTROCHROMIC DISPLAY DEVICE

BACKGROUND OF THE INVENTION

The present invention relates to an electro-optical display containing an electrochromic material which manifests reversible variations in its light adsorption properties upon application of a properly controlled voltage or current. This display is referred to as an "electrochromic display (ECD)" hereinafter.

The present invention relates, more particularly, to an electrochromic display device which displays a desired pattern in the negative type.

[DESCRIPTION OF PRIOR ART]

Electrochromic materials are well known in the art. Typical materials are a film of amorphous tungsten ($WO_3$), a film of amorphous molybdenum oxide ($MoO_3$), and a thin film of transition metal oxide. Examples were disclosed in Talmey, U.S Pat. No. 2,319,765, and Deb et al. U.S. Pat. No. 3,521,941.

Such electrochromic materials can be shaped in a desired pattern to display desired characters, symbols and patterns by reversibly selecting its light absorption properties through the use of the electric control. Examples were disclosed in U.S. Pat. No. 1,068,744 and the above-mentioned U.S. Pat. No. 3,521,941.

There are three types of ECD cells which employ the thin film of transition metal oxide. The first one includes liquid electrolyte as the source of ions (the abovementioned U.S. Pat. No. 2,319,765). The second type includes an inorganic insulation film (the above-mentioned U.S. Pat. No. 3,521,941). The last type includes a solid state electrolytic-film (Castellion et al, U.S. Pat. No. 3,712,710). The solid state ECD is not as stable as compared with the semiliquid state ECD.

The electrolyte comprises a gel of sulfuric acid (M.D. Meyers et al, U.S. Pat. NO. 3,708,220), or $\gamma$-Butyrolactone or propylene carbonate mixed with $LiClO_4$ (L.C. Beagle, U.S. Pat. No. 3,704,057).

Injection and extration of electric charges at the counter electrode are preferably conducted when the electrochromic layer is also formed on the counter electrode. Examples were disclosed in R.D. Giglia et sl, U.S. Pat. No. 3,819,252 or Witzke et al, U.S. Pat. NO. 3,840,287. In this case, the background of the display is formed by adding pigment to the electrolyte (R.D. Gilia et al, U.S. Pat. No. 3,819,252), or by disposing an opaque plate behind the display electrode (Giglia, U.S. Pat. No. 3,892,472, or Leibowitz, U.S. Pat. No. 3,944,333).

Display electrodes of the seven-segmented type for displaying the numeral information were disclosed in Giglia et al, U.S. Pat. No. 3,827,784. Technique for protecting the edge portion of the electrochromic layer formed on the display electrode through the use of an insulation layer was disclosed in Eric Saurer, U.S. Pat. No. 3,836,229, Giglia, U.S. Pat. No. 3,892,472, and Leibowitz, U.S. Pat. No. 3,944,333.

OBJECTS AND SUMMARY OF THE INVENTION

Accordingly, an object of the present invention is to provide an electrochromic display device which displays information in the negative type.

Another object of the present invention is to provide an electrochromic display cell suited for mass production.

Still another object of the present invention is to enhance the visibility of the information displayed in the electrochromic display device.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a transparent electrode is formed on a transparent glass substrate in a desired configuration. An electrochromic layer is formed on the entire surface of the transparent glass substrate inclusive of the surface of the transparent electrode. The electrochromic layer is initially placed in the coloration state. A back layer which exhibits a color sensation different from that of the coloration state of the electrochromic layer is disposed above the electrochromic layer.

A desired transparent electrode, or a segment electrode, is selected to bleach the electrochromic layer formed thereon. The back layer can be seen through the segment electrode and the bleached electrochromic layer formed thereon. In this way, a desired pattern is displayed in the negative fashion.

In another embodiment, the electrochromic layer is formed only on the segment portion of the transparent electrode. Lead electrode portions of the transparent electrode are coated with an insulation film to protect the transparent electrode from the electrolyte. A film which exhibits color sensation similar to that of the coloration state of the electrochromic layer is formed on the other surface of the transparent glass substrate at portions where the segment electrode is not formed.

A desired transparent electrode, or a segment electrode is selected to bleach the electrochromic layer formed thereon. The back layer can be seen through the segment electrode portion and, therefore, a desired pattern is displayed in the negative fashion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Referring now in detail to the drawings, and to facilitate a more complete understanding of the present invention, a basic structure of the ECD will be first described with reference to FIGS. 1 through 4.

Figure 1:
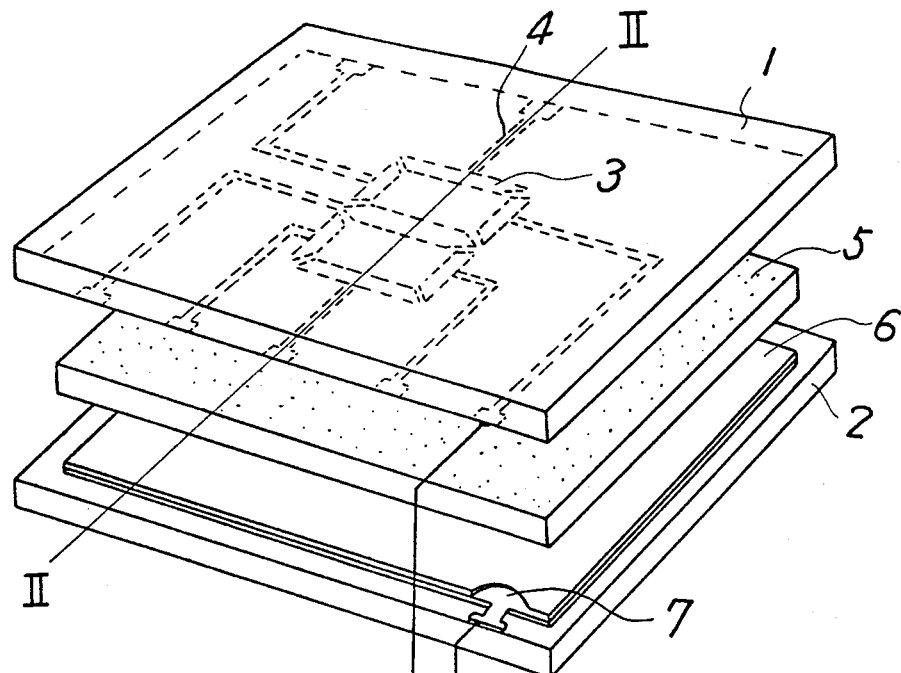
FIG. 1 is a perspective view of a basic structure of an electrochromic display cell.
Figure 2:
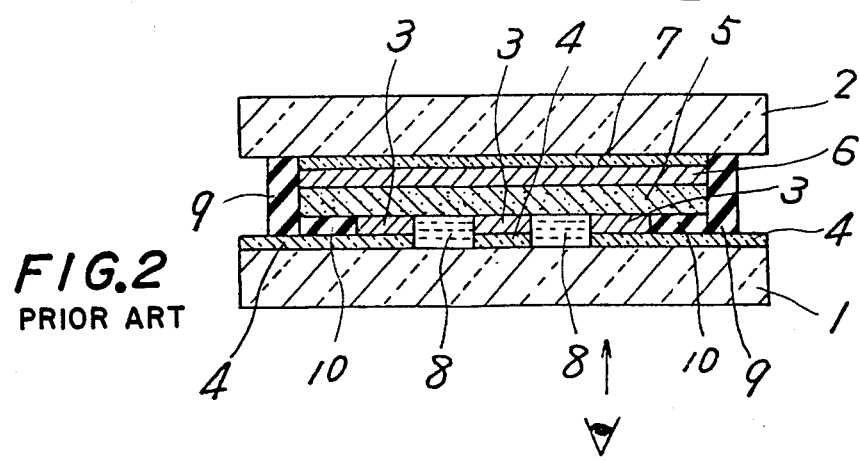
FIG. 2 is a cross-sectional view of the electrochromic display cell as seen at II—II of FIG. 1.

FIGS. 1 and 2 show a basic structure of an electrochromic display cell. The ECD cell mainly comprises two transparent glass substrates 1 and 2. On the inner surface of the glass substrate 1, a transparent electrode 4 including a segment electrode and a lead electrode is formed. An electrochromic layer 3 is formed on the segment electrode. On the inner surface of the other glass substrate 2, a counter electrode 7 coated with an electrochomic layer 6 is formed. A porous plate 5 impregnated with pigment is disposed between the two glass substrates 1 and 2 for providing the display background. Electrolyte 8 is filled in the cell and, therefore, the porous plate 5 is impregnated with the electrolyte 8. A spacer 9 is provided for determining the distance provided between the two glass substrates 1 and 2, and for sealing purposes. An insulator layer 10 is formed on the lead electrode for protecting the lead electrode from the electrolyte 8. When the electrochromic layer 3 is placed in the bleached state, the operator can uniformly see the porous plate 5 through the front glass substrate 1. When a desired segment electrode 4 is selected, namely, when a desired segment electrode 4 is made negative with respect to the counter electrode 7 through the use of a power source E and a selection switch S, the electrochromic layer 3 formed on the thus selected segment electrode 4 is placed into the colorationstate. In the case where the electrochromic layer 3 comprises a WO$_3$ film or a MoO$_3$ film, the selected segment is colored blue. Accordingly, a desired pattern is displayed on the background, for example, the white background created by the porous plate 5 by properly selecting the segments.

In the ECD cell shown in FIGS. 1 and 2, it is very difficult to exactly determine the edge portions of the electrochromic layer 3 and the insulator layer 10.

Figure 3:
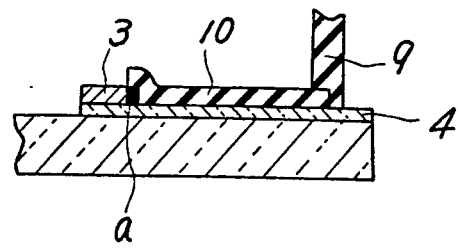
FIGS. 3 and 4 are cross-sectional views of an essential part of the electrochromic display cell of FIG. 2.

In the case where the insulator layer 10 overlaps a portion a of the electrochromic layer 3 as shown in FIG. 3, the coloration state of the portion "a" can not be controlled. More specifically, the portion "a" is gradually colored when the electrochromic layer 3 is placed in the coloration state due to the distribution of electric charges. The thus colored portion "a" can not be bleached even when the electrochromic layer 3 is placed in the bleached state, because the portion "a" is coated with the insulator layer 10.

Figure 4:
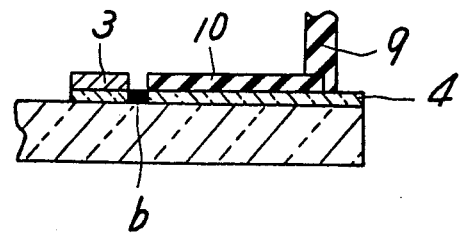

In the case where the insulator layer 10 does not reach the edge of the electrochromic layer 3 as shown in FIG. 4, that is, when a portion "b" of the transparent electrode 4 is exposed to the electrolyte, the portion "b" is damaged by the electrolyte due to electro-chemical reaction.

Figure 5:
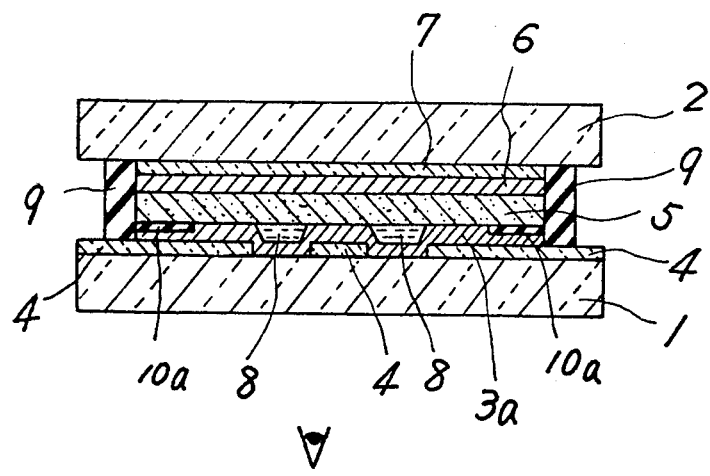
FIG. 5 is a cross-sectional view of an embodiment of an electrochromic display cell of the present invention.

FIG. 5 shows an embodiment of the ECD cell of the present invention. Like elements corresponding to those of FIGS. 1 and 2 are indicated by like numerals.

The transparent electrode 4 including the segment electrodes and the lead electrodes is formed on the transparent glass substrate 1 in a desired configuration. An electrochromic layer 3a is formed on the entire surface of the glass substrate 1. An insulator film 10a is formed on the electrochromic layer 3a at selected positions corresponding to the lead electrodes. In this embodiment, the electrically controllable portion, or, the display portion is determined by the transparent electrode 4 and the insulator film 10a. The porous plate 5 exhibits a color sensation different from that of the coloration state of the electrochromic layer 3a.

The electrochromic layer 3a is initially placed in the coloration state. In the case where the electrochromic layer 3a comprises a WO$_3$ film or a MoO$_3$ film, the ECD cell is uniformly blue when the display is in the OFF state. To display a desired pattern, desired segment electrodes are selected to bleach the electrochromic layer 3a formed thereon. Through the segment portion where the electrochromic layer 3a is bleached, the operator can see the porous plate 5 which exhibits color sensation different from that of the coloration state of the electrochromic layer 3a. When the application of the voltage is reversed, the electrochromic layer 3a formed on the selected segment electrode is colored or returned to the initial condition. Since the coloration degree of the electrochromic material is proportional to the amount of the electric current flowing therethrough, the segment portion can be colored to a degree identical with that of the remaining portions by properly controlling the applied voltage and the application period of the coloration voltage.

The thus formed ECD cell does not have the portion b shown in FIG. 4. The distribution of the coloration species will not create any deterioration when the segment is in the coloration state, because the entire electrochromic layer 3a is in the coloration state. Moreover, the distribution of the coloration species toward the segment portion, under the condition where the segment is placed in the bleached state, will not create any troubles because the segment portion is electrically controllable.

EXAMPLE I (for the embodiment of FIG. 5)

The transparent glass substrates 1 and 2 are flat glass plates having a 1 mm through 3 mm thickness. The glass substrate 1 carries a preferably shaped transparent conductive layer 4, the electrochromic layer 3a and the insulator film 10a formed thereon.

The transparent conductive layer 4 comprises an In$_2$O$_3$ film doped with SnO$_2$. The transparent conductive layer 4 is formed through the use of an electron beam evaporation method to a thickness of 1800 through 2000 Å, and has a resistance value of 20–30 ⏀/sq. On the thus formed conductive layer, a WO$_3$ film is formed to a thickness of 4000 Å through the use of the conventional mask evaporation method. The thus formed layers are shaped in a desired configuration through the use of a photo-etching method by using the positive type resist, for example, AZ-1350 manufacture by Shipley Co. The positive type resist is developed by the alkaline liquid and, therefore, the WO$_3$ film is etched at the same time when the resist is developed. The In$_2$O$_3$ film is etched by a mixture liquid comprising ferric chloride and hydrochloric acid.

On the entire surface of the thus formed substrate, a $WO_3$ film is formed to a thickness of 1000 Å through the use of vacuum evaporation techniques, thereby forming the electrochromic layer 3a. The insulator film 10a is formed on the electrochromic layer 3a at the position where lead electrodes are formed. The insulator film 10a is made of $SiO_2$ and formed to a thickness of 3500 Å through the use of masked electron beam evaporation techniques.

The counter electrode 7 is formed in a same manner that is conducted for forming the transparent conductive layer 4. That is, the counter electrode 7 is made of the $In_2O_3$ film and has a thickness of 1800 through 2000 Å. The $WO_3$ film 6 is formed on the counter electrode 7 to a thickness of 5000 Å.

The spacer 9 mainly comprises a thin glass plate of 1 mm thickness, and is sealed through the use of epoxy resin such as R.2401/HC.160 manufactured by Somal Kogyo KK by maintaining the cell at 120° C. for 30 minutes.

The porous plate 5 is a porous alumina ceramic plate, for example, C-3 manufactured by Nippon Toki Co. The electrolyte is impregnated into the porous plate 5. The electrolyte includes γ-butyrolactone and lithium perchlorate by 1.0 M/γ both manufactured by Kishida Chemical Co. The electrolyte is injected into the cell under the conditions of a pressure of $1 \times 10^{-2}$ mmHg and a temperature of $-40°$ C. After completion of the impregnation, the injection inlet is sealed with epoxy resin, for example, "Quick Set" manufacture by Konishi Co., Ltd.

The thus formed ECD cell is exposed to the sun beam for two days to conduct the optical write-in operation, whereby the entire electrochromic layer is placed in the coloration state. The transmission factor of the thus formed electrochromiclayer in the air is 40% when the detection is carried out through the use of a 590 mm wave-length beam. This value corresponds to the saturated transmission factor of the $WO_3$ of 1000 Å thickness.

To bleach the thus colored electrochromic layer, the electric charge of 16 mc/cm$^2$ is required. Therefore, the driver circuit connected to the ECD cell of this example develops constant current of 32 mA/cm$^2$ for 0.5 seconds to change the state of the electrochromic layer. The above-mentioned ECD cell is now under life test for more than five million cycles.

Figure 6:
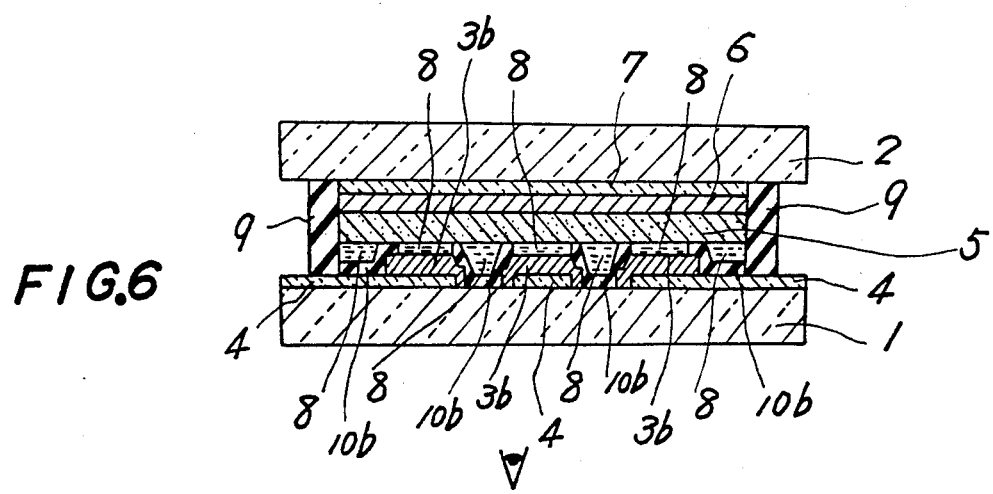
FIG. 6 is a cross-sectional view of another embodiment of an electrochromic display cell of the present invention.

FIG. 6 shows another embodiment of the ECD cell of the present invention. Like elements corresponding to those of FIG. 5 are indicated by like numerals.

In this embodiment, an electrochromic layer 3b is formed only on the segment electrodes in such a manner that the transparent electrode 4 is covered by the electrochromic layer 3b, or, the electrochromic layer 3b has a greater size than the segment electrodes. An insulator layer 10b is formed on the substrate to cover the entire surface except the segment portions. The insulator layer 10b exhibits a color sensation similar to that of the coloration state of the electrochromic layer 3b. The insulator layer 10b is preferably an epoxy resin doped with pigment. The insulator layer 10b must be stable against the electrolyte.

EXAMPLE II (for the embodiment of FIG. 6)

An $In_2O_3$ film is formed on the 1 mm thick glass plate in a desired configuration to provide the segment electrodes and lead electrodes. The $WO_3$ film of 5000 Å thickness is formed thereon and shaped to cover the segment electrodes, or more specifically, to have edge portions greater than that of the segment electrodes by 2 mm length.

The insulator layer 10b comprises epoxy resin mixed with blue pigment, for example, "Prussian Blue" manufactured by Dainichi Seika Kogyo KK. by 5 wt%. The insulator layer 10b is formed to 20 μm thickness through the use of a screen printing method. Remaining portions are similar to that of the EXAMPLE I.

Figure 7:
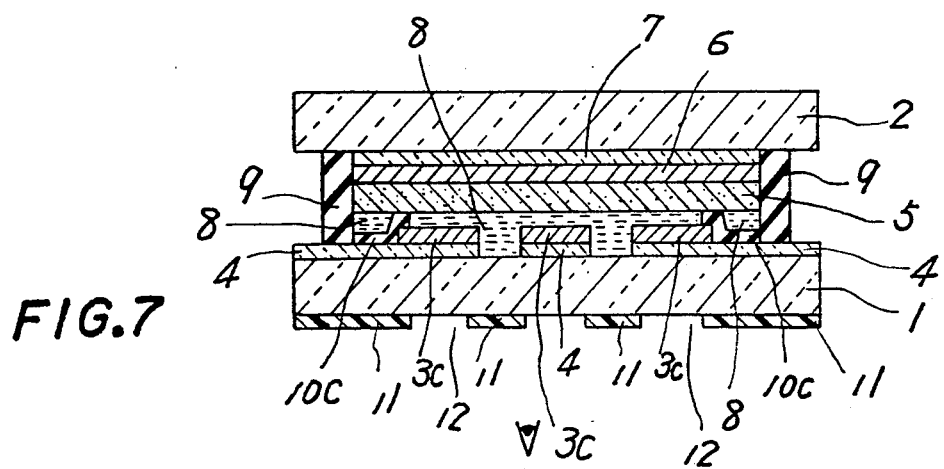
FIG. 7 is a cross-sectional view of still another embodiment of an electrochromic display cell of the present invention.

FIG. 7 shows still another embodiment of the ECD cell of the present invention. Like elements corresponding to those of FIG. 5 are indicated by like numerals.

In the embodiment of FIG. 7, both a transparent segment electrode 4 and an electrochromic layer 3c are formed to have a slightly larger size than that is required. A color film 11 which exhibits color sensation similar to that of the coloration state of the electrochromic layer 3c is formed on the outer surface of the transparent glass substrate 1. The film 11 is provided with openings 12 at positions corresponding to the segment electrodes. The glass substrate 1 must be thin to minimize the parallax of the film 11 and the electrochromic layer 3c.

EXAMPLE III (for the embodiment of FIG. 7)

The glass substrate 1 is a glass plate of 0.5 mm thickness. The $In_2O_3$ film and the $WO_3$ film of 5000 Å thickness are formed on the glass plate and shaped in such a same manner that is conducted in the EXAMPLE I. An insulator layer 10c is formed in such a manner that is conducted in the EXAMPLE I. The film 11 is formed on the other surface of the glass plate through the use of a silk screen. The film 11 comprises blue paint, for example, epoxy resin (R.2401/HC.11 manufactured by Somal Kogyo KK) doped with dye such as "DEANT" of the following formula by 0.25 wt%.

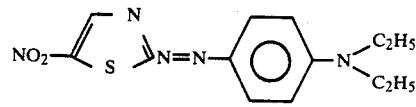

The thus obtained blue paint is painted to have 20 μm thickness through the use of the screen printing method. The thus formed film 11 has the transmission factor of 40%. The printing machine used to form the film 11 is "LS-20N" manufactured by Newlong Seimitsu Kogyo KK, and the screen used to form the film 11 is tetron monomulti fiber screen, 180 mesh, emulsion of 5 μm thickness manufactured by Mesh Kogyo KK.

Remaining portions are similar to that of the EXAMPLE I.

The dye suited for the film 11 is as follows:

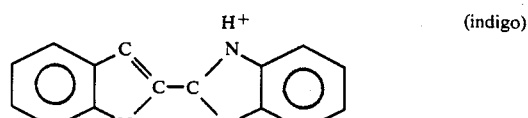
(indigo)

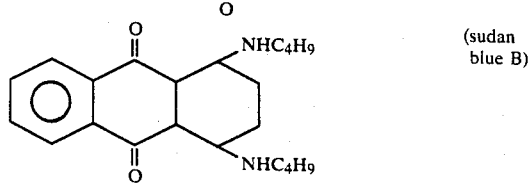
(sudan blue B)

-continued

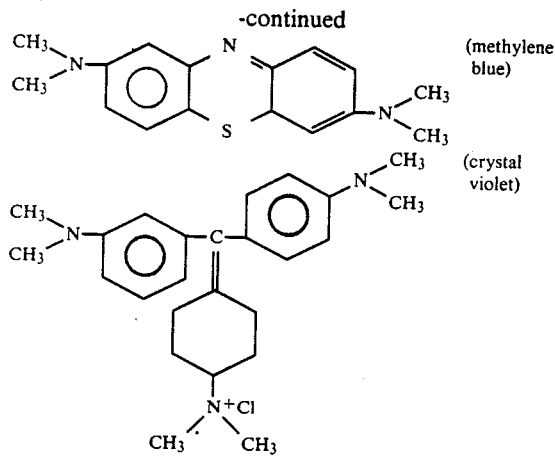

(methylene blue)

(crystal violet)

Figure 9:
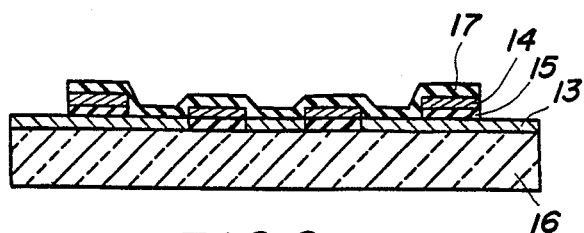
FIG. 9 is a cross-sectional view of the front substrate as seen at IX—IX of FIG. 8.
Figure 8:
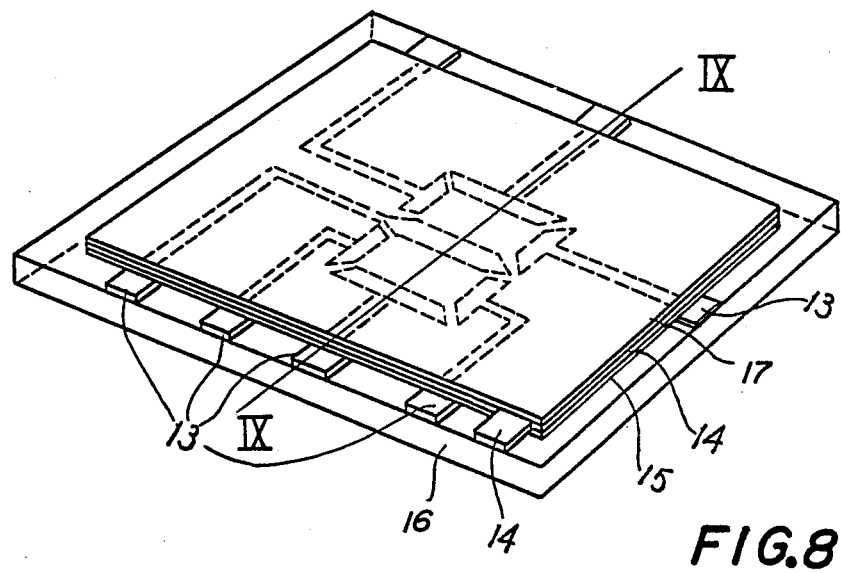
FIG. 8 is a perspective view of a front substrate employed in yet another embodiment of an electrochromic display cell of the present invention.

FIGS. 8 and 9 show a front substrate of yet another embodiment of the ECD cell of the present invention. The rear substrate and the porous plate 5 are similar to the embodiments of FIGS. 5 through 7.

The front substrate mainly comprises a glass substrate 16, an electrochromic layer 17 comprising a $WO_3$ film or a $MoO_3$ film, a first transparent conductive film 13, a second transparent conductive film 14, and an insulator layer 15 for electrically separating the second transparent conductive film 14 from the first transparent conductive film 13. The first transparent conductive film 13 is shaped to form the segment electrodes and the lead electrodes, and the second conductive film 14 is formed at positions where the sgement electrode are not formed for controlling the background of the display.

Fabrication steps of the front substrate of FIGS. 8 and 9 will be described with reference to FIGS. 10(A) through 10(D).

Figure 10:
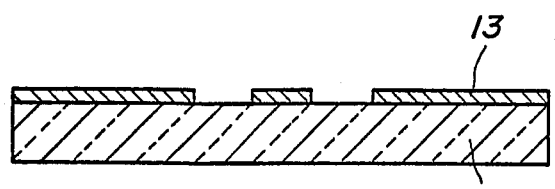
FIGS. 10(A) through 10(D) are cross-sectional views showing fabrication steps of the front substrate of FIGS. 8 and 9.
Figure 10:
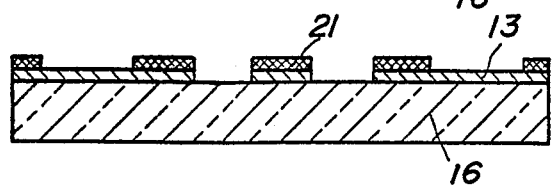
Figure 10:
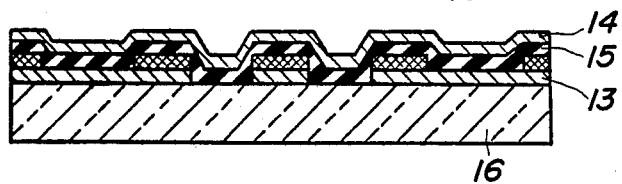
Figure 10:
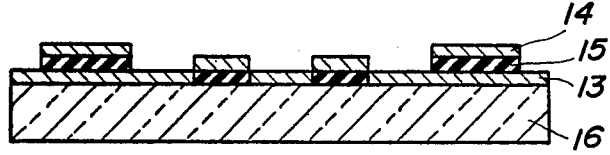

(I) The transparent conductive film 13 is formed on the flat glass plate 16 in a desired configuration as shown in FIG. 10(A). The transparent conductive film 13 functions as the segment electrodes and the lead electrodes connected to the segment electrode.

(II) A mask 21 comprising photo resist or etching resist is formed on the transparent conductive film 13 at positions corresponding to the segment electrodes and terminals of the lead electrodes as shown in FIG. 10(B).

(III) Through the use of the resist mask formed by the above method, the insulator layer 15 is formed on the entire surface of the substrate. Thereafter, the second transparent conductive film 14 is formed on the entire surface of the insulator layer 15 as shown in FIG. 10(C). The insulator layer 15 must be dense to ensure the electrical isolation between the conductive films 13 and 14.

(IV) The resist mask 21 is removed to shape the second transparent conductive film 14 and the insulator layer 15 as shown in FIG. 10(D).

(V) The electrochromic layer 17 is formed on the entire surface of the substrate except the terminal portions of the lead electrodes through the use of a metal mask as shown in FIG. 9.

The coloration state of the electrochromic layer 17 at the segment portions is controlled by the segment electrodes or the first conductive film 13. The coloration state of the electrochromic layer 17 at the background portions is controlled by the second conductive film 14.

The entire electrochromic layer 17 is initially placed in the coloration state through the use of conductive films 13 and 14 by maintaining the conductive films 13 and 14 at a negative potential with respect to the counter electrode 7 (see FIGS. 5 through 7). The coloration state is memorized even when the coloration voltage is removed. A desired segment is placed into the bleached state by applying a positive voltage with respect to the counter electrode 7 to a desired segment electrode or the conductive film 13. Through the thus selected segment, the operator can see the porous plate 5 (see FIGS. 5 through 7) which exhibits a color sensation different from that of the coloration state of the electrohcromic layer 17. The thus selected segment can be returned to the initial coloration state by applying the coloration voltage to the segment electrode. It is preferable to regenerate the coloration state of the entire electrochromic layer 17 at a predetermined time interval. One method to regenerate the entire electrochromic layer 17 is to electrically connect the second conductive layer 14 to the segment electrode which is in the coloration state.

EXAMPLE IV (for the embodiment of FIGS. 8 and 9)

The transparent glass substrate 16 is a flat glass plate having 1 mm through 3 mm thickness. The transparent conductive film B comprises an $In_2O_3$ film doped with $SnO_2$. The transparent conductive film 13 is formed through the use of the electron bean evaporation method to a thickness of 1800 through 2000 Å, and has a resistance value of 20–30 Ω/sq. The thus formed transparent conductive film 13 is shaped in a desired configuration through the use of a photo-etching method by using the positive type resist, for example, AZ.1350 manufactured by Shipley Co. The $In_2O_3$ film is etched by mixture liquid comprising 42Be' ferric chloride and 12 normal hydrochloric acid at 40° C.

The mask 21 is formed through the use of the screen printing method. The printing machine is "LS-20" manufactured by Newlong Seimitsu Kogyo KK, and the screen plate is "Tetron 300-mesh" manufactured by Mesh Kogyo KK. The etching resist is "Naz-dar #300" manufactured by Naz-dar Co. The etching resist is maintained at 120° C. for twenty minutes for drying purposes. Therefore, the insulator layer 15 is formed through the use of vacuum evaporation techniques. The insulator layer 15 is a $SiO_2$ film of 2 μm thickness. The conductive film 14 is formed on the entire surface of the insulator layer 15 through the use of a vacuum evaporation method.

The thus formed substrate is disposed within trichloroethylene manufactured by Kishida Chemical Co. Ultrasonic vibrations are applied to the substrate to remove the resist. The $WO_3$ film is formed on the thus formed substrate to a thickness of 5000 Å through the use of the vacuum evaporation method except the portions of the terminals for the lead electrodes. Remaining portions are similar to that of the EXAMPLE I.

The coloration signal applied to the segment electrode is −1V.500 msec, and the bleaching signal is =2.3V.1 sec. The regeneration is conducted once every 60 minutes for one second. The device is under the above-mentioned life test for more than one year.

EXAMPLE V (for the embodiment of FIGS. 8 and 9)

The resist mask is "Screenable Maskant MSN42B" manufactured by Minetch Co. The insulator layer 15 is formed through the use of the CVD method (CVD furnance manufactured by Watkins-Johnson Co. under the condition of the substrate temperature of 450° C. The formed insulator layer 15 is a $SiO_2$ film of 1000 Å thickness. Instead of the porous ceramic plate 5, a yellow Tefron filter manufactured by Sumitomo Electric Industries Ltd. is used. Remaining portions are similar to the EXAMPLE IV.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A negative type electrochromic display cell comprising:
   a front transparent substrate;
   a transparent electrode means formed on said front transport substrate to provide a desired display configuration;
   a first continuous electrochromic layer overlying said transparent electrode and formed on the portions of said front transparent substrate not having said transparent electrode means formed thereon;
   a rear substrate;
   a counter electrode formed on said rear substrate;
   a second electrochromic layer formed on said counter electrode;
   a background creating member disposed between said first and said second electrochromic layers, said background creating member exhibiting a color sensation which is different from the coloration state exhibited by said electrochromic layers; and
   an electrolyte impregnated into said background creating member.

2. The negative type electrochromic display cell of claim 1, wherein said transparent electrode means comprises segment electrodes and lead electrodes connected to said segment electrodes.

3. The negative type electrochromic display cell of claim 2, wherein an insulator film is formed on said electrochromic layer at positions corresponding to the positions where said lead electrodes are formed.

4. The negative type electrochromic display cell of claim 2, wherein said lead electrodes include terminal means for outer connection purposes, said electrochromic layer is formed on the entire surface of said front transparent substrate except said terminal means being free of said electrochromic layer.

5. The negative type electrochromic display cell of claim 4, wherein said transparent electrode comprises an $In_2O_3$ film doped with $SnO_2$.

6. The negative type electrochromic display cell of claim 4, wherein said electrochromic layer comprises a $WO_3$ film.

7. The negative type electrochromic display cell of claim 4, wherein said background creating member comprises a porous ceramic plate.

8. The negative type electrochromic display cell of claim 4, wherein said front transparent substrate comprises a flat glass plate having a thickness ranging from 1 mm to 3 mm.

9. The negative type electrochromic display cell of claim 2, wherein the portion of said first electrochromic layer overlying said segment electrodes has a greater thickness than the remaining portions thereof.

10. A negative type electrochromic display cell comprising:
    a front glass substrate;
    transparent segment electrodes and transparent lead electrodes connected to said segment electrodes formed on said front glass substrate;
    a first electrochromic layer formed on said transparent segment electrodes;
    a rear substrate;
    a counter electrode formed on said rear substrate;
    a second electrochromic layer formed on said counter electrode;
    a background creating member disposed between said first and second electrochromic layers, said background creating member exhibiting a color sensation which is different from the coloration state exhibited by said electrochromic layers;
    a color layer disposed in front of said background creating member at positions where said segment electrodes are not formed, said color layer exhibiting a color sensation which is similar to that of the coloration state of said electrochromic layer; and
    an electrolyte impregnated into said background creating member.

11. A negative type electrochromic display cell, comprising:
    a front transparent substrate;
    a transparent electrode means formed on said front transparent substrate to provide a desired display configuration, said transparent electrode means comprising segment electrodes and lead electrodes connected to said segment electrodes;
    a first transparent insulator layer formed on said front transparent substrate at portions where said transparent electrode is not formed;
    a second transparent insulator layer formed on said lead electrodes;
    a transparent conductive film formed on said first and second transparent insulator layers;
    a first continuous electrochromic layer overlying said segment electrodes and said transparent conductive film;
    a rear substrate;
    a counter electrode formed on said rear substrate;
    a second electrochromic layer formed on said counter electrode;
    a background creating member disposed between said first and second electrochromic layers, said background creating member exhibiting a color sensation which is different from the coloration state exhibited by said electrochromic layers; and
    an electrolyte impregnated into said background creating member.

* * * * *